Figure 1:
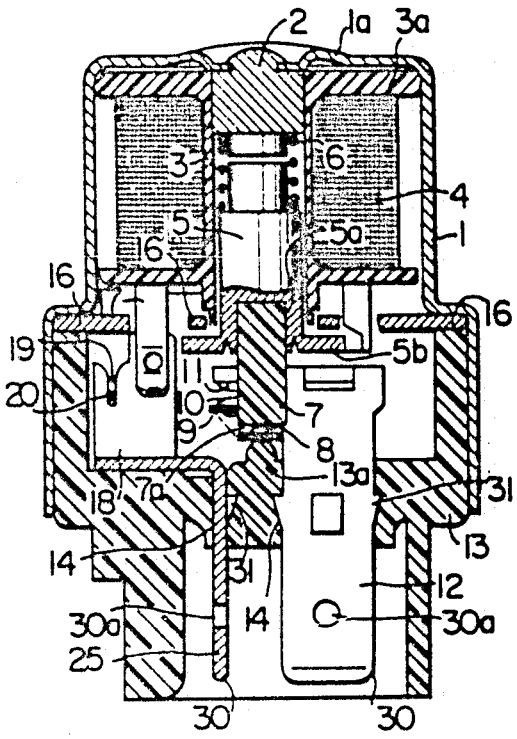
Figure 2:
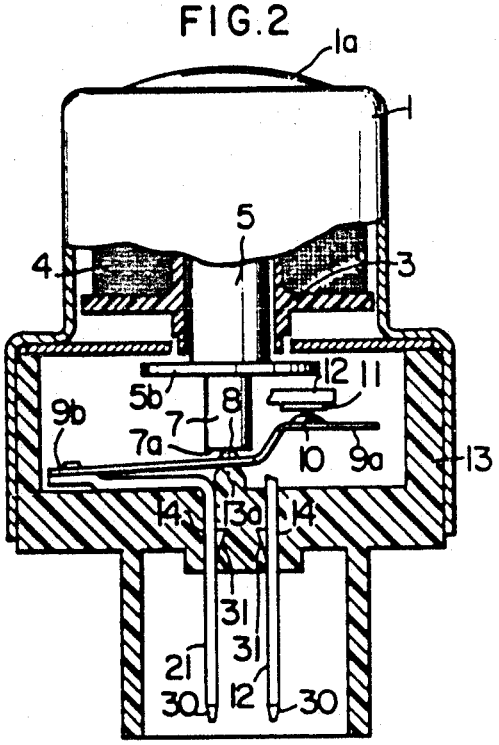
Figure 3:
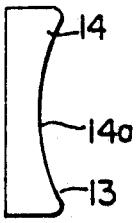
Figure 4:
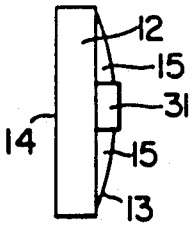
Figure 5:
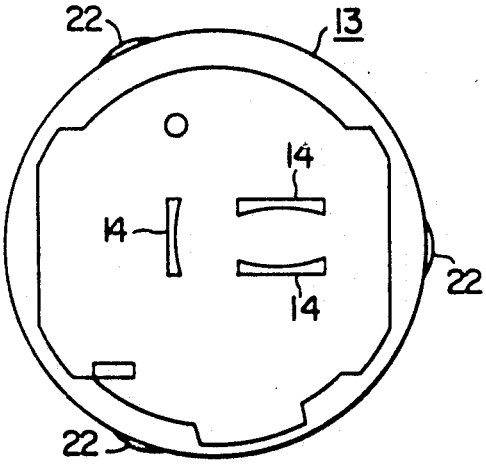
Figure 6:
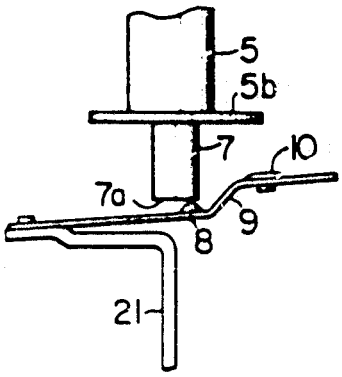
Figure 7:
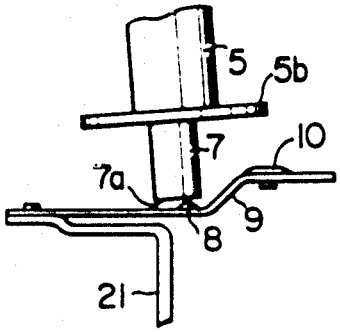
Figure 8:
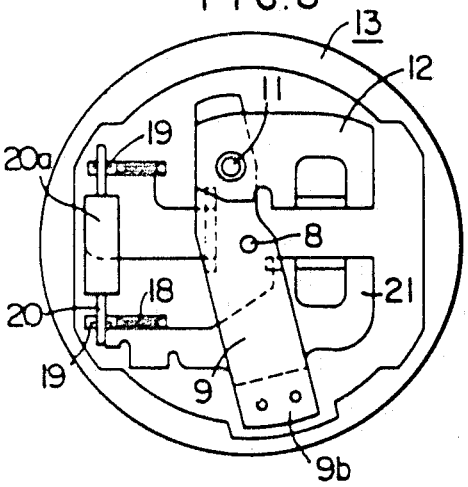
Figure 9:
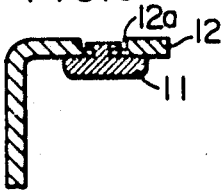
Figure 10:
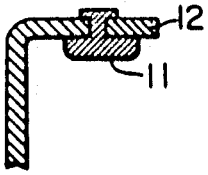
Figure 11:
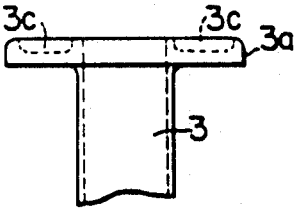
Figure 12:
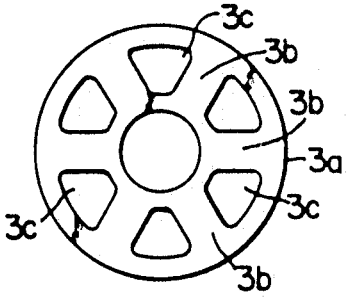
Figure 13:
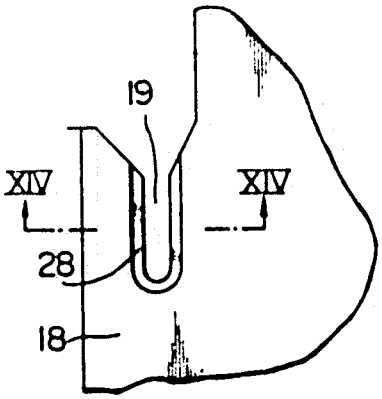
Figure 14:
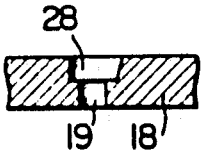

United States Defensive Publication [19] (H) [11] T100,904

Kawamura [43] Aug. 4, 1981

[54] PLUNGER TYPE ELECTROMAGNETIC RELAY

[76] Inventor: Siyoutaro Kawamura, 55, Tonokicho-2-chome, Toyokawa-shi, Japan

[21] Appl. No.: 69,077

[22] Filed: Aug. 23, 1979

[30] Foreign Application Priority Data

Sep 29, 1978 [JP] Japan ..... 53-134485

[51] Int. Cl.[3] ..... H01H 67/02

[52] U.S. Cl. ..... 335/131; 335/185

[57] ABSTRACT

A plunger type electromagnetic relay includes a contact spring provided with a moving contact at one end thereof and having the other end rotatably fitted to a terminal, and the contact spring is further provided with a projection on the central portion thereof. When an electromagnetic coil is not energized, the projection on the contact spring is urged downward by the bottom portion of an operating rod attached to the lower portion of a movable core, thus establishing a normally-open condition. When the electromagnetic coil is energized, the movable core is moved upward and consequently the bottom portion of the operating rod and the projection of the contact spring are also moved upward in their engaged condition. When this occurs, an electric connection is completed between the moving contact at one end of the contact spring and a fixed contact provided in a relay housing. The contact structure comprising the bottom portion of the operating rod and the projection of the contact spring reduces the assembly errors due to the automatic assemblage of electromagnetic relays of the same type.

2 Claims, 2 Sheets Drawing,

13 Pages Specification

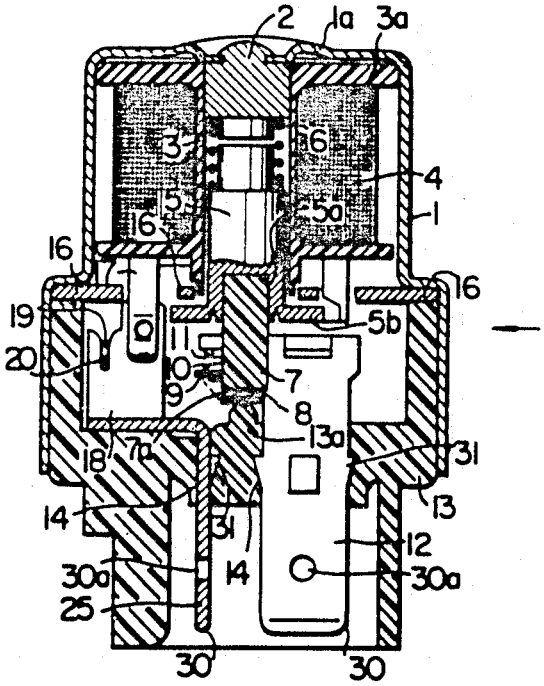

The file of this unexamined application may be inspected and copies thereof may be purchased (849 O.G. 1221, Apr. 9, 1968).